United States Patent

Searby et al.

[11] Patent Number: 6,046,753
[45] Date of Patent: *Apr. 4, 2000

[54] ELECTRONIC IMAGE PROCESSING SYSTEM FOR MODIFYING INITIAL IMAGE DATA

[75] Inventors: Anthony David Searby, Newbury; Martin Stewart Ingram, Winchester, both of United Kingdom

[73] Assignee: Quantel Limited, Newbury, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/634,513

[22] Filed: Apr. 18, 1996

Related U.S. Application Data

[63] Continuation of application No. 08/125,558, Sep. 23, 1993, abandoned, which is a continuation-in-part of application No. 08/195,519, Feb. 14, 1994, and application No. 08/097,950, Jul. 26, 1993, abandoned.

[30] Foreign Application Priority Data

Sep. 25, 1992 [GB] United Kingdom ............ 9220266

[51] Int. Cl.[7] .................................................. G09G 5/00
[52] U.S. Cl. ............................................. 345/511; 345/526
[58] Field of Search ..................................... 345/185, 189, 345/192, 190, 193, 200, 201, 199, 173, 179, 521, 525, 526, 509, 516, 517, 508, 511, 515; 395/164, 166, 165

[56] References Cited

U.S. PATENT DOCUMENTS

| | | |
|---|---|---|
| 4,514,818 | 4/1985 | Walker . |
| 4,688,190 | 8/1987 | Bechtolscheim . |
| 4,727,425 | 2/1988 | Mayne et al. ........................... 345/199 |
| 4,777,598 | 10/1988 | Kellar et al. . |
| 4,786,897 | 11/1988 | Takanashi et al. . |
| 4,812,836 | 3/1989 | Kurakake et al. ...................... 345/201 |
| 4,931,956 | 6/1990 | Stapleton ............................... 345/173 |
| 5,018,078 | 5/1991 | Urabe et al. . |
| 5,020,003 | 5/1991 | Moshenberg . |
| 5,043,919 | 8/1991 | Callaway et al. . |
| 5,058,041 | 10/1991 | Rose et al. . |
| 5,107,251 | 4/1992 | Frank et al. . |
| 5,131,080 | 7/1992 | Fredrickson et al. . |
| 5,285,323 | 2/1994 | Hetherington et al. ............... 345/200 |

FOREIGN PATENT DOCUMENTS

| | | |
|---|---|---|
| 0202014 | 11/1986 | European Pat. Off. ........ G06F 15/64 |
| 0260883 | 9/1987 | European Pat. Off. ........ G06F 15/62 |
| 0283159 | 9/1988 | European Pat. Off. . |
| 0423930 | 4/1991 | European Pat. Off. . |
| 0449618 | 10/1991 | European Pat. Off. . |
| 1547119 | 12/1977 | United Kingdom ............ H04N 1/40 |
| 2137856 | 10/1984 | United Kingdom . |
| 2211691 | 7/1989 | United Kingdom .......... H04N 7/133 |
| 2244411 | 11/1991 | United Kingdom ............ G06F 15/72 |

OTHER PUBLICATIONS

Clark et al., "Distributed Processing in a High–Performance Smart Image Memory", Lambda, Fourth Quarter 1980, pp. 40–45.

*Primary Examiner*—Chanh Nguyen
*Attorney, Agent, or Firm*—Cooper & Dunham LLP

[57] ABSTRACT

An electronic image processing system 1 includes a large capacity store 2 having a source area 3 for storing data representing an initial image and a destination area 4 for storing data representing a modified image. A control processor 5 calculates transformation parameters and controls the transfer of portions of the initial image data to a high speed low capacity cache store 9. A spatial filter 10 effects transformations on the data in the cache store 9 and the thus modified image portion data is written to the destination area 4.

15 Claims, 3 Drawing Sheets

ELECTRONIC IMAGE PROCESSING SYSTEM FOR MODIFYING INITIAL IMAGE DATA

CROSS-REFERENCE TO RELATED APPLICATIONS

This is a continuation of application Ser. No. 08/125,558 filed Sep. 23, 1993, now abandoned, which in turn is a continuation-in-part of Ser. No. 08/195,519 filed Feb. 14, 1994, and a continuation-in-part of Ser. No. 08/097,950 filed Jul. 26, 1993 now abandoned.

BACKGROUND

1. Field of the Invention

The invention relates to an electronic image processing system and particularly, but not exclusively, to a system for modifying initial image data to produce data representing a modified image.

2. Description of the Related Art

Electronic image processing systems are known for modifying an initial image to produce a modified image having a different shape, size and/or position as compared to that of the initial image. For example, our British patent application published as GB-A-2,113,950 and corresponding US patent U.S. Pat. No. 4,602,286, the teachings of which are incorporated herein by reference, both disclose a system for performing picture composition. Our British patent application published as GB-A-2,119,594 and corresponding US patent U.S. Pat. No. 4,563,703, the teachings of which are incorporated herein by reference, both disclose a system for producing effects by writing input video signals received in raster order to a store in such an order that the shape, size and/or position of the image is altered. Also, our British patent application published as GB-A-2,158,671, the teachings of which are incorporated herein by reference, discloses a system in which picture data is modified using three-dimensional transformations so that the shape, size and/or position of the image appears to undergo a corresponding change in three dimensional space. Once modified, the three-dimensional signals are converted into two-dimensional signals which represent the image as it would appear if projected onto a viewing screen thereby producing a perspective effect in the modified image. A similar perspective manipulation is disclosed in our European patent application published as EP-A-283,158 and corresponding US patent U.S. Pat. No. 4,951,040, the teachings of which are incorporated herein by reference.

The systems disclosed in the above mentioned patent specifications are directed to the modification of image data at television resolution up to high definition standards e.g. 1250 lines at 50 Hz. As the size or resolution of an image increases there is a corresponding increase in the amount of data that has to be modified in order to achieve a given effect. There is also a corresponding increase in the amount of time taken to process the data, and when manipulating print-quality pictures comprising say 8000×10000 picture points the delay is noticeable and unacceptable to the user of the system.

Where there is a change in the perspective of the image, the transformations to be applied to the image data will vary along the height and/or width of the image in order to achieve the effect of foreshortening associated with perspective views. The need to vary the transformations applied to image elements between one element and the next introduces a further level of complexity to the system.

SUMMARY

According to one aspect of the invention there is provided an electronic image processing apparatus comprising: a slow large capacity store comprising a multiplicity of storage locations for storing image data including image data representing an initial image; a high speed small random access cache store; and a controller for controlling the transfer of data representing a selected portion of the initial image from the large capacity store to the cache store for processing, and for controlling the transfer of processed data from the cache store back to the large capacity store for storage at appropriate storage locations therein.

According to another aspect of the invention there is provided a method of modifying initial image data to produce data representing a modified image, the method comprising: storing image data representing an initial image in a slow large capacity store; selecting data representing a portion of the initial image; transferring the selected data from the large capacity store to a high speed small random access cache store; processing the data transferred to the cache store; and transferring the processed data from the cache store back to the large capacity store and storing the same at appropriate storage locations therein.

According to another aspect of the invention there is provided an electronic image processing system in which an initial high resolution image is held in a high capacity storing means, a low resolution representation of the image or a portion thereof is derived from the initial high resolution image and displayed on a displaying means, and the displayed image is manipulable by way of user operable means, the system comprising a small capacity high speed storing means and being arranged to transfer portions of the initial high resolution image thereto a portion at a time with each portion comprising plural groups of data arranged such that the data in each group is transferred substantially in parallel, calculating means responsive to said user operable means for calculating transformation parameters by which the manipulated displayed image can be derived from the initial high resolution image, and a variable filter responsive to said transformation parameters for deriving high resolution transformed image portions from said high resolution image portions in the high speed storing means and outputting said transformed image portions for use in deriving the manipulated displayed image and for storing in the high capacity storing means once the user is satisfied with manipulations effected to the displayed image.

The above and further features of the invention are set forth with particularity in the appended claims and together with advantages thereof will become clearer from consideration of the following detailed description of an exemplary embodiment of the invention given with reference to the accompanying drawings.

DESCRIPTION

Figure 1:
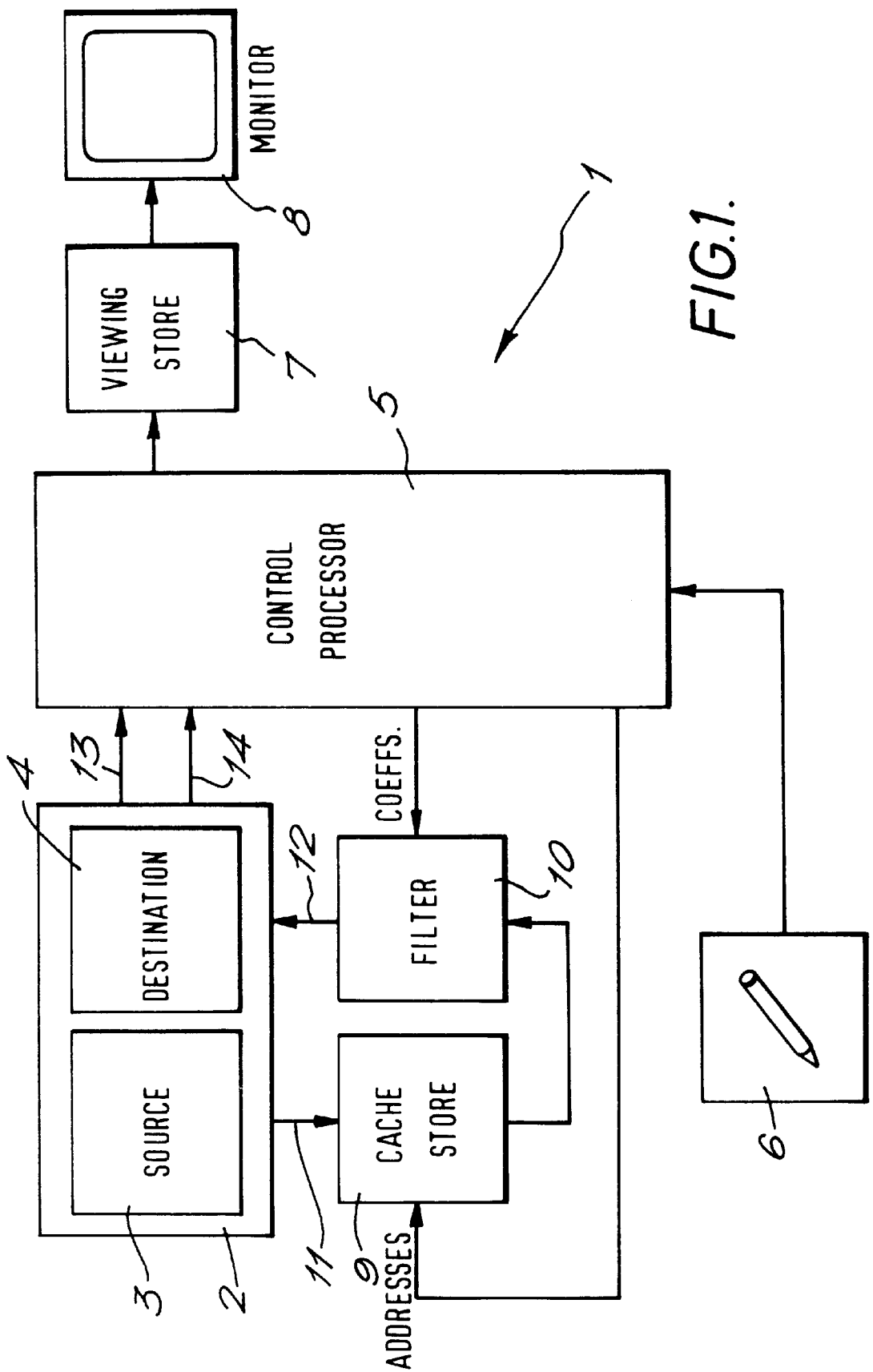
FIG. 1 is a schematic diagram of an electronic image processing system.

Turning now to FIG. 1 of the accompanying drawings, an electronic image processing system 1 comprises a store 2.

The store 2 is a high capacity store capable of storing at least two large or high resolution images. Our co-pending British Patent Application No. 9215949, the teachings of which are incorporated herein by reference, discloses a high capacity store which is well suited to storing at least two high resolution images. Typically a large or high resolution image, referred to hereinafter simply as a high resolution image, will be an image comprising of the order of 8000× 10000 picture elements. The system 1 also comprises a bulk store (not shown) for the off-line storage of image data which has been or is to be modified by the system, which bulk store is connected to the store 2.

The store comprises two storing areas identified respectively as a source area 3 and a destination area 4. These two storing areas are entirely independent and indeed can be built as separate source and destination stores which are controlled independently from each other. However, explanation of the system is simplified if the store 2 is regarded as a single unit of the system. The configuration shown in FIG. 1 is preferred over an arrangement comprising two separate stores because in practice it is simpler to build than a two store system.

It will be appreciated by those possessed of the appropriate skills that the terms "source" and "destination" are merely used herein for the sake of convenience to distinguish between the area of the store 2 used to hold data representing an unmodified image (the source area) and the area of the store 2 to which is written modified data representing the modified image (the destination area). The store 2 is built from dynamic random access memory devices (DRAMs) which provide a large storage capacity at relatively low cost, but which are relatively slow in the transfer of data thereto and therefrom. Even relatively fast (and correspondingly expensive) DRAM devices currently available have a cycle time of some 120–140 nS.

However, there is no need to use these expensive fast DRAM devices in the system 1 shown in FIG. 1, and much slower and cheaper DRAMs can be used.

Figure 2:
FIG. 2 is a schematic diagram showing data layout in a store.

In order to speed up the access time, the DRAM store 2 is arranged such that groups of storage locations within the store are accessed together. As shown in FIG. 2 of the accompanying drawings, locations within the store are divided into horizontal groups (referred to herein as "hosepipes") a, b, c, d. A hosepipe of data is read in a single read cycle from the store 2 and thus the picture elements in the hosepipe are effectively read simultaneously from respective locations in the source area 3 of the store 2. As will be appreciated by those possessed of the appropriate skills, to this end the store comprises control circuitry including multiplexers (not shown) similar to that described in our abovementioned copending British Patent Application No. 9215949. The use of hosepipes to increase the speed at which data is read from a store is in itself well known. The amount of data in each hosepipe depends on the structure of the store control circuitry and its ability to multiplex data in the hosepipes onto output lines from the store. Preferably, in the system 1 a hosepipe will contain data relating to 128 picture elements read from horizontally adjacent locations in the store 2. The use of hosepipes of this size gives the potential to increase the speed at which picture element data is read from the store by an order of 128. However, this kind of access time can only be approached when the destination for the required data is well suited to receiving data in large horizontal blocks. For example, a raster scan display builds up a displayed image as a series of horizontal lines and therefore is well suited to receiving data as a series of hosepipes.

It should be noted that the approach of using hosepipes does not always result in an increase in speed. A disadvantage of using hosepipes is that the store loses flexibility because it is no longer a truly random access device. Each hosepipe is a sequence of pixels and regardless of how few pixels are required, whole hosepipes nevertheless have to be accessed. Thus, for example, where data for four pixels w, x, y, z as shown in FIG. 2 are required and each pixel is in a different hosepipe e, f, g, h it is necessary to read four hosepipes of data, i.e. data for 512 pixels, in order to access the required four pixels.

In use the source area 3 contains data representing an image to be modified and the destination area 4 contains data representing the image once modified. Data is modified by a control processor 5 in accordance with transformation parameters, such as those disclosed in the above mentioned EP-A-283,159. To this end the control processor 5 is responsive to a stylus and touch tablet device 6. The system also comprises a viewing store 7 for storing data representing an image to be displayed and a monitor 8 for displaying the image. The monitor 8 is preferably able to display images to an HDTV standard, for example 1250 lines, and the viewing store 7 comprises sufficient storage locations for at least one frame of image data.

The system is arranged so that the image displayed on the monitor 8 can be derived from data held in either the source store area 3 or the destination store area 4. The displayed image may be a portion of the image represented by the data in say the source 3, or the displayed image may be a version of the whole image in say the destination 4 down-converted from the high resolution of the destination 4 (8000×10000 picture elements) to the relatively low resolution of the monitor 8 (approximately 1250×2000 picture elements) or, of course, it may be a portion of the high resolution image down-converted by a suitable factor for display on the monitor 8.

The system 1 is arranged to operate in a preview mode during which the user may experiment with transformations of the image without committing to a given transformation until he is satisfied with the effect. In this preview mode image data from the source 3 is down converted as appropriate, transformed with the parameters defined at that moment in time by the users manipulation of the stylus and touch tablet, and the transformed data written to the destination area of the source store 2 for output to the viewing store 7. The down-conversion of the data, which is itself well known, is performed by the control processor 5 as data is transferred from the source store 2 to the viewing store 7. The viewing store 7 is updated regularly with data for display of the transformed image on the monitor 8. Thus, in response to user manipulations of the stylus and touch tablet device 6 an image which changes in accordance with the manipulations is displayed on the monitor 8. Display data is derived from the image data in the source 3 substantially in real time so that the user can see immediately the effect of his manipulations on the image. This enables the user to try different effects before committing to a particular transformation. Once the user is satisfied with an effect it is selected thereby causing the system to modify the high resolution image from the source store area 3 and to store the thus modified high resolution image data in the destination store area 4.

A cache store 9 receives data from the source 3 under the control of the control processor 5. It should be noted that the control processor 5 controls operation of the system 1 as a whole but that for the sake of clarity only some control lines are shown connecting the control processor to other units in the system 1. The cache store 9 is built from static RAM (SRAM) devices which provide for a relatively fast transfer of data thereto and therefrom. Typically, SRAMs have an access time 20–30 nS which is five or six times faster than the access time of the faster DRAMs currently available. The cost of SRAM devices is relatively high and therefore the cache store 9 is considerably smaller than the store 2 in order to keep down costs. Typically, the cache store 9 comprises 128×256 storage locations and, thus, the cache store 9 can be filled with 256 hosepipes of data from the store 2. This means that the cache store 9 can be filled relatively quickly with data from the store 2 and once the data is in the cache store 9 it is accessible extremely quickly in a truly random order.

It will be appreciated by those possessed of the appropriate skills that the combination of a large DRAM-based store together with a small SRAM-based cache store provides a cost-effective high capacity store configuration in which data corresponding to small image areas can be accessed extremely quickly with data corresponding to individual picture elements being randomly accessible. Since image transformation requires high speed random access to individual picture elements in small image areas in order to effect the necessary transformations, this kind of store configuration is well suited to supplying data for image transformation at a speed suitable for real time display at high definition display rates.

The system further comprises a filter 10 which effects spatial transforms to the image data in the cache store 9 and writes the thus transformed data to the destination 4 thereby effecting the user selected manipulation to the image. Both the cache store 9 and the filter 10 are controlled by the control processor 5 in response to user manipulations of the stylus and touch tablet device 6. The control processor responds to such manipulations by calculating addresses in the cache store 9 at which are stored data representing pixels to be transformed and calculating for each pixel the transformation coefficients which are output to the filter 10. The use of a filter 10 separate to the control processor 5 facilitates the processing of data during transforms involving a change of perspective by freeing the processor 5 to calculate the next set of transformation parameters to be used while the filter is applying the present set of transformation parameters, to selected source image elements in order to determine a destination image element.

It should be apparent from the foregoing description that the store 2 is a multi-port device comprising at least one port 11 for reading data therefrom for the cache store 9, one port 12 for writing data thereto from the filter 10 and one port 13 for transferring data to the viewing store 7. In practice, the high data rates demanded by the HDTV monitor 8 are satisfied by providing a second video port 14 for transferring optionally data of the initial image or the modified image to the viewing store 7. Thus, the store 2 comprises four ports each requiring access to the data therein. Access through the ports 11 to 14 to the store 2 is arranged to occur on a cyclic basis with port 11 having access during a first time period, video port 13 having access during a second time period, port 12 having access during a third time period, and video port 14 having access during a fourth time period. In other words video access is interleaved in time with the reading and writing of data from and to the store 2. Clearly, this further increases, by a factor of four, the time taken to read data from the store 2 or to write modified data back to the store 2. Accessing data in the store 2 therefore takes about 500 nS, a relatively slow process. However, this reduction in speed is more than compensated for by the random access cache store 9 which enables a batch of e.g. 128×256 image pixels to be held for random access processing between times when port 11 has access to the store 2.

Image data processing is performed by the system 1 in so-called read-side transformations, that is to say image data is read from a source (in this case the cache store) in random order and modified to create data representing a transformed image which is stored at a destination in raster scan order. (In contrast, in a write-side transformation data is read from a source (i.e. the cache store) in raster scan order and written to a destination in random order). The manner in which image data processing is performed will be described with reference to FIG. 3 of the accompanying drawings.

Figure 3B:
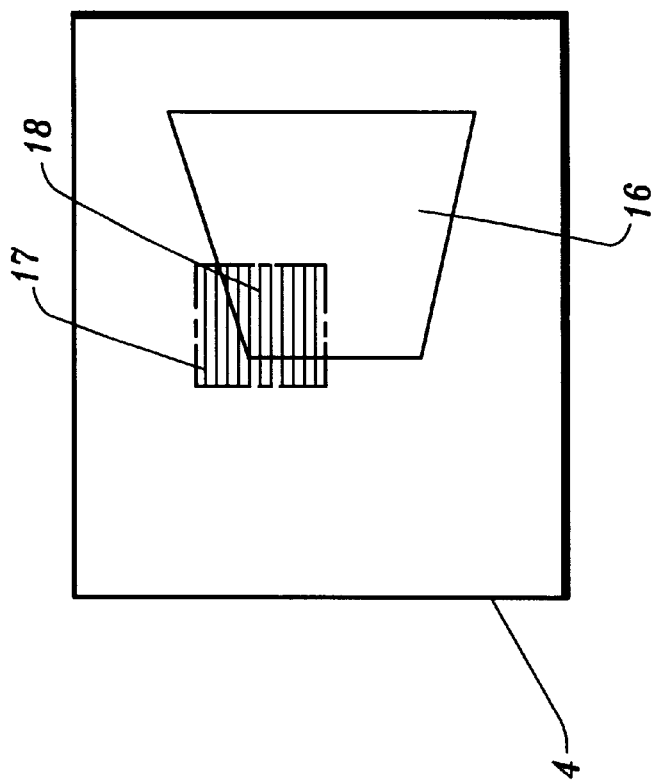
FIGS. 3A, 3B and 3C show schematic views representing a stored image.
Figure 3A:
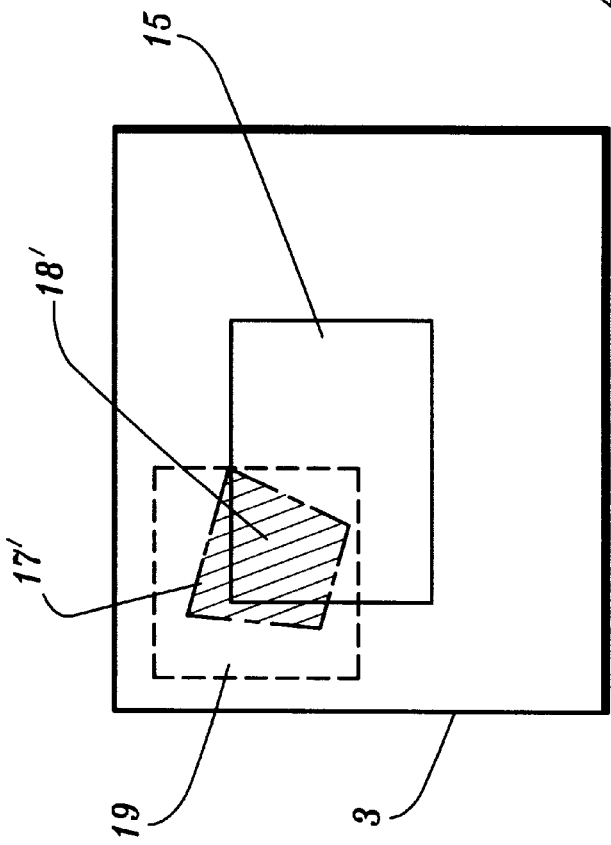
Figure 3C:
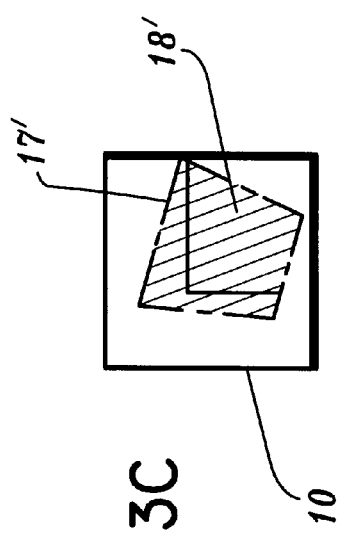

Referring to FIG. 3, data representing an initial image 15 is held in the source 3. As the stylus and touch tablet device 6 is manipulated the control processor calculates transformation parameters to be applied to the data representing the initial image 15 in order to derive therefrom data representing a transformed image 16. Once derived, the data representing the transformed image 16 is held in the destination store 4.

Once the size, shape and position of the transformed image 16 in the destination 4 has been calculated (as described in EP-A-283,159) it is a simple matter to determine how an area of the transformed image 16 would appear if mapped back into the source store 3. Use is made of this to identify groups of pixel data to be transferred from the source area 3 of the store 2 to the cache store 9 in order to optimise the deriving of the transformed image data. An area 17 is identified in the destination 4 and is mapped into a corresponding area 17' in the source 3. The area 17 is selected by trying different sized areas in the destination 4 until one is found that contains at least part 18 of the transformed image 16 and which when mapped into the source store 2 defines a corresponding area 17' which is smaller than an area 19 in the source 3 corresponding to the size of the cache store 9. The corresponding area 17' contains an area 18' of initial image data corresponding to the part 18 in the transformed image 16. Once the area 17' of data in the source 3 has been identified it is transferred to the cache store 9.

As mentioned hereinabove the system performs read side processing and, thus, the data in the cache store 9 is accessed randomly to enable the filter to produce consecutive adjacent picture elements for the destination area 4. Each picture element in the destination is formed from contributions from at least one and usually many picture elements in the source. Accordingly, several picture elements are read from the cache store to the filter 10 where they are combined for example in a weighted summation based on transformation data determined by the control processor 5 to produce a single transformed picture element (pixel) which is stored at the destination area 4 of the store 2. The process is repeated on a pixel-by-pixel basis until all pixels in the area 17 of the transformed image have been produced and stored in the destination area 4.

Calculating the transformation data on a pixel-by-pixel basis provides for a flexible system and enables more complex transformations to be performed thereby. For example, perspective foreshortening is readily effected by such a system. Whilst the transformations are being applied by the filter to the data in the area 17' the control processor 5 calculates the next area of the initial image 15 to be transferred to the cache store 9. The process is repeated until the data for the complete modified image 16 has been calculated and stored in the destination area 4 of the store 2.

The DRAM store 2 is an inherently slow device made slower by the need to interleave video, read and write cycles. The use of hosepipes can increase the speed at which data in the store is accessed in the case where a large number of horizontally adjacent locations are involved but this approach reduces the flexibility in accessing the store. Even using a fast DRAM it would take about 500 nS to read a hosepipe of pixels from the source store.

The use of a fast cache store 9 together with a filter 10 significantly increases the speed at which data representing a transformed image can be created. Once the data for pixels in area 17' has been transferred from the source to the cache store each new pixel in the cache can be accessed in about 20–30 nS and this significantly increases the rate at which data representing the transformed image is created. Access to the cache store is not interleaved and the cache store is formed from SRAM which is inherently faster than DRAM.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

We claim:

1. An electronic image processing apparatus comprising:
   a first large capacity store for storing digital data representing an initial image, in which store the data is accessible as data sequences;
   a second large capacity store for storing digital data representing a manipulated form of said initial image;
   a small capacity, high speed, random access cache store for storing selected data sequences from said first large capacity store which together comprise data representing a small portion of the image; and
   a processor for:
      selecting initial image data for transfer from the first large capacity store to the cache store by mapping an identified area in the second large capacity store in which will be stored data representing an area of the manipulated form of the initial image onto a corresponding data area in the first large capacity store in which is stored data representing a corresponding area in the initial image and which corresponding data area comprises an amount of data not greater than a data storage capacity of the cache store;
      controlling the transfer of said selected initial data from the first large capacity storage means to the cache store;
      providing required transformation parameters for use in manipulation of the data stored in the cache store;
      employing said required transformation parameters to modify the data from the cache store, to produce manipulated data representing said identified area in the manipulated form of the image; and
      outputting the manipulated data to the second large capacity store at locations therein corresponding to the identified area.

2. An apparatus as claimed in claim 1, wherein the processor operates to supply successively to the cache store data representing small portions of the initial image, each such portion comprising data from which a different part of the manipulated form of the image stored in the second large capacity store is derived, the processor predetermining and locating in the first large capacity store the data of each said small portion by reference to data of the corresponding part of the manipulated form of the image, and providing and employing for each said successive portion of data supplied to the cache store a respective set of transformation parameters for conversion of each said portion of data to the corresponding part of the manipulated form of the image.

3. An apparatus as claimed in claim 2, wherein the processor is arranged to transfer substantially simultaneously a plurality of data sequences comprising the small portion of the initial image.

4. An apparatus as claimed in claim 2, wherein the processor is arranged to derive addresses in the first large capacity store at which data representing said small portions is stored and in the second large capacity store at which data representing the transformed part is stored.

5. An apparatus as claimed in claim 1, further comprising a variable filter which is supplied with said required transformation parameters to effect modification of the data in the cache store to that needed in the corresponding part of the manipulated form of the image.

6. An apparatus as claimed in claim 5, wherein the processor operates to assemble further transformation parameters needed for modifying a further portion of said image stored in the first large capacity store whilst the filter employs said required transformation parameters to modify the data stored in the cache store.

7. An apparatus as claimed in claim 1, wherein the first and second large capacity stores comprise a single store which is arranged to store said initial image data in a first storing area and to store the manipulated image data in a second storing area.

8. An apparatus as claimed in claim 1, further comprising a user operable input device, the processor providing said transformation parameters in response to user manipulations of said input device.

9. An apparatus as claimed in claim 8, wherein said user operable input device comprises a stylus and touch tablet device.

10. An apparatus as claimed in claim 1, further comprising a viewing store for storing data representing an image to be displayed, which data is derived by the processor from data in the first large capacity store or in the second large capacity store.

11. An apparatus as claimed in claim 10, further comprising a monitor for displaying the image represented by the data in the viewing store.

12. An apparatus as claimed in claim 10, wherein the processor is arranged to update continually the viewing store with data representing the initial image as modified in accordance with said required transformation parameters.

13. An apparatus as claimed in claim 1, wherein said first and second large capacity large capacity store comprise dynamic random access memory devices and the cache store comprises static random access memory devices.

14. An electronic image processing system for producing data representing a modified form of an image from data representing an initial image, the system comprising:
   a large capacity store having a source area for storing data representing an initial image and a destination area for storing data representing a modified image derived from the initial image, the data in the store being accessible as data sequences in random sequence order;
   a small capacity random access cache store for storing initial image data representing a portion of the initial image comprising plural data sequences from the source area of the large capacity store;

a filter for effecting transformations to the data in the cache store to create modified image data representing a modified portion of the image for storage as plural data sequences comprising a portion of the modified image data in the destination area of the large capacity store; and a processor for selecting initial image data for transfer from the first large capacity store to the cache store by mapping an identified area in the second large capacity store in which will be stored data representing an area of the manipulated form of the initial image onto a corresponding data area in the first large capacity store in which is stored data representing a corresponding area in the initial image and which corresponding data area comprises an amount of data not greater than a data storage capacity of the cache store; determining the transformations to be effected by the filter, for identifying in the source area of the large capacity store the initial image data sequences that together define the initial image portion by determining an area in the modified form of the image that will be represented by data produced by manipulating an amount of initial image data not greater than the capacity of the cache store, and for controlling the transfer of data sequences comprising the initial image portion from the source area of the large capacity store to the cache store and from the filter to the destination area of the large capacity store.

15. A method of processing digital data representing an initial image to generate digital data representing a manipulated form of said image, the method comprising:

storing digital data representing an initial image in a first large capacity store in which the data is accessible as data sequences;

storing selected data sequences from said first large capacity store which together comprise data representing a small portion of the image in a small storage capacity, high speed, random access cache store by selecting initial data for transfer from the first large capacity store to the cache store by mapping an identified area in a second large capacity store in which will be stored data representing an area of the manipulated form of the initial image onto a corresponding data area in the first large capacity store in which is stored data representing a corresponding area in the initial image and which corresponding data area comprises an amount of data not greater than the data storage capacity of the cache store;

controlling the transfer of said selected initial data from the first large capacity store to the cache store;

providing transformation parameters for use in manipulation of the data stored in the cache store;

employing said required transformation parameters to modify the data from the cache store, to produce manipulated data representing said identified area in the manipulated form of the image; and outputting the manipulated data to the second large capacity store at a location therein corresponding to the said identified area.

* * * * *